United States Patent
Seemann

Patent Number: 5,702,663
Date of Patent: Dec. 30, 1997

[54] VACUUM BAG FOR FORMING FIBER REINFORCED COMPOSITE ARTICLES AND METHOD FOR USING SAME

[75] Inventor: William Seemann, Gulfport, Miss.

[73] Assignee: Scrimp Systems, LLC, R.I.

[21] Appl. No.: 660,187

[22] Filed: May 31, 1996

Related U.S. Application Data

[63] Continuation of Ser. No. 465,230, Jun. 5, 1995, Pat. No. 5,601,852, which is a continuation of Ser. No. 250,169, May 27, 1994, Pat. No. 5,439,635, which is a continuation-in-part of Ser. No. 18,827, Feb. 18, 1993, Pat. No. 5,316,462.

[51] Int. Cl.$^6$ ............................................... B29C 70/48
[52] U.S. Cl. .................. 264/510; 264/258; 264/316; 264/571; 425/112; 425/389
[58] Field of Search ............................... 264/138, 154, 264/220, 225, 257, 258, 316, 510, 511, 571; 425/110, 112, 388, 389, 405.1, 89

[56] References Cited

U.S. PATENT DOCUMENTS

| | | | |
|---|---|---|---|
| 2,913,036 | 11/1959 | Smith | 264/102 |
| 3,146,148 | 8/1964 | Mitchella et al. | 156/382 |
| 4,132,755 | 1/1979 | Johnson | 264/553 |
| 4,238,437 | 12/1980 | Rolston | 264/102 |
| 4,312,829 | 1/1982 | Fourcher | 264/571 |
| 4,359,437 | 11/1982 | Le Comte | 264/102 |
| 4,560,523 | 12/1985 | Plumley et al. | 264/102 |
| 4,822,436 | 4/1989 | Callis | 156/211 |
| 4,902,215 | 2/1990 | Seemann, III | 425/406 |
| 4,942,013 | 7/1990 | Palmer et al. | 264/511 |
| 4,975,311 | 12/1990 | Lindgren | 428/156 |
| 5,052,906 | 10/1991 | Seemann | 425/112 |
| 5,087,193 | 2/1992 | Herbert, Jr. | 425/543 |
| 5,096,651 | 3/1992 | Le Comte | 264/510 |
| 5,123,985 | 6/1992 | Evans et al. | 156/213 |
| 5,129,813 | 7/1992 | Shephard | 425/504 |
| 5,304,339 | 4/1994 | Le Comte | 264/511 |
| 5,316,462 | 5/1994 | Seemann | 425/112 |
| 5,439,635 | 8/1995 | Seemann | 264/510 |
| 5,601,852 | 2/1997 | Seemann | 425/389 |

FOREIGN PATENT DOCUMENTS

| | | | |
|---|---|---|---|
| 1504274 | 12/1967 | France. | |
| 50-3098 | 1/1975 | Japan | 425/405.1 |
| 3-162933 | 7/1991 | Japan | 264/571 |
| 9200963 | 1/1993 | Netherlands. | |

OTHER PUBLICATIONS

P. Lazarus, "Reverse MACT", Professional BoatBuilding Magazine, Oct./Nov., 1994, No. 31, p. 3.
P. Lazarus, "Infusion!", Part One, Professional BoatBuilding Magazine, Oct./Nov., 1994, No. 31, pp. 42–53.
P. Lazarus, "Infusion", Part Two, Professional BoatBuilding Magazine, Dec./Jan., 1995, No. 32, pp. 28–34.
Film Technology, Inc., advertisement for Quick Draw™ Films, High–Performance Composites 1995 Sourcebook, p. 29.
W. Sutliff, "Composites Promise Affordable Ship Structures", Centerline, May–Jun., 1991, pp. 1–4.
L.H. Walker, "Low Cost, High Quality Composite Ship Structures Technology Demonstrated", Research Release, Carderock Division, Naval Surface Warfare Center, May, 1993, pp. 1–4.
SCRMP Systems, product brochure. (No date).

*Primary Examiner*—Robert Davis
*Attorney, Agent, or Firm*—Weingarten, Schurgin, Gagnebin & Hayes LLP

[57] ABSTRACT

An vacuum bag for forming of a fiber reinforced composite article, made of a curable elastomer, having molded in resin distribution means. Optional vacuum conduits are molded into the periphery of the bag, causing the bag to be adapted to any number of mold shapes. The bag contains a resin distribution conduit sealed into the vacuum bag. A multiplicity of cross channels are formed on the inner surface of the bag, covering most of the area under which the fiber lay up is placed within the mold. These cross channels can be formed from a pattern of multiple, variegated small dots or pentagons, which, under vacuum, leave a multiplicity of small crisscross channels running along the inner surface of the vacuum bag. This pattern of distribution channels covers most of the fiber lay up, except for a perimeter area which insures resin flow into rather than across the fiber lay up.

57 Claims, 5 Drawing Sheets

VACUUM BAG FOR FORMING FIBER REINFORCED COMPOSITE ARTICLES AND METHOD FOR USING SAME

RELATED APPLICATIONS

This Application is a continuation of application Ser. No. 08/465,230, filed Jun. 5, 1995, now U.S. Pat. No. 5,601,852, which is a continuation of application Ser. No. 08/250,169, filed May 27, 1994, now issued as U.S. Pat. No. 5,439,635, which is a continuation-in-part of application Ser. No. 08/018,827, filed Feb. 18, 1993, now issued as U.S. Pat. No. 5,316,462.

BACKGROUND OF THE INVENTION

This invention relates to transfer molding techniques for the production of fiber reinforced resin composite structures. In particular, it relates to processes and apparatus for molded, vacuum bag construction of fiber reinforced resin composite structures of various shapes.

Fiber reinforced resin composite structures have taken many shapes and forms, including tubes or conduits as employed in the chemical processing industry, flat sheets and compound shapes as employed in boat building and extensive curved shapes as employed in aerospace. In these constructions a fiber reinforcement is laid up against a mold to provide the desired shape. This fiber reinforcement may be prewetted with resin, forming a "pre-preg" structure. More often a dry lay up of fiber is placed upon a mold and then wetted through by resin. The resin is allowed to set and cure upon the mold to form the fiber reinforced resin composite structure. Critical problems involved in this process include the uniform distribution of resin into the fiber, the elimination of air voids and bubbles, elimination of areas not wetted by resin within the fiber structure, and reduction of the use of excess resin or waste of resin in the process. The apparatus and processes, used to make these structures therefore vary considerably depending upon the specific shape and form of the structure to be produced.

A common technique is the so called vacuum bag technique which has been used to form fiber reinforced plastic structures. In vacuum bag techniques, flexible sheets, liners or bags are used to cover a mold which contains the dry or wet fiber lay up. The edges of the flexible sheet are clamped or sealed against the mold to form a sealed envelope surrounding the lay up. A catalyzed liquid plastic or resin is introduced into the envelope, into the interior of the bag, to wet the fiber, and a vacuum is applied to the bag interior via a vacuum line to collapse the flexible sheet against the fiber and surface of the mold. The vacuum serves to shape the article to the mold, to draw the resin through the fiber mat, completely wetting the fiber, and to remove any air which would form voids within the completed article.

The vacuum is continued while the plastic wetted fiber is pressed and cured against the mold to form the desired shaped fiber reinforced plastic structure. Since the entire resin curing process occurs within a sealed bag, and a continuous application of vacuum draws off all fumes through filters, resin fumes from the process are prevented from escaping into the ambient work space.

My prior U.S. Pat. No. 5,052,906 and U.S. Pat. No. 4,902,215 disclose vacuum bag structures in which distribution media are placed within the vacuum bag, surrounding the fiber lay up, in order to enhance the uniform distribution of resin through the composite upon the application of a vacuum. In order to enhance the separation of the completed molded fiber reinforced plastic structure from the mold and the bag, and to reduce the chances of contamination of the surface of the structure, peel plies, in the form of porous thin sheets which do not adhere to resin, are provided between the distribution media and the fiber lay up.

In the cited patents, fiberglass reinforced laminates are shown that have very desirable resin to fiber ratios and uniform mechanical properties. The vacuum bag process produces high strength structures in very complex shapes including boat hulls. However, each article created in this manner requires a separate set up of vacuum bag and distribution media; while this is desirable for one of a kind production, it is not the most efficient method of molding repeated identical structures.

In early vacuum bag structures, such as British Patent No. 944,955, the reinforced fiber structure is laid upon a single cavity mold, the mold covered by a flexible sheet or vacuum bag and the outer edges of the sheet sealed upon the mold to leave a space containing the dry fiber lay up. The liquid resin is introduced via supply line located at the top center of the bag and the vacuum is drawn on the bag by a vacuum line located at a peripheral edge of the mold. The collapse of the bag under the vacuum presses and forces the resin and fiber against the contour of the mold. A viscous resin require squeezing or rolling to distribute the resin through the fiber.

Other patents have suggested channels to distribute the resin through the fiber including U.S. Pat. No. 4,312,829 to Fourcher and U.S. Pat. No. 2,913,036 to Smith.

In U.S. Pat. No. 4,942,013 to Palmer, et al. a structure is shown in which the resin is introduced through an opening at one end of the mold and a vacuum is drawn from the other end of the mold, thus drawing the resin laterally across and then through the fiber lay up. A second fiberglass layer is required to aid in the distribution of the resin.

SUMMARY OF THE INVENTION

This invention is the formation of a vacuum bag, preferably of silicone rubber, having molded therein a resin distribution means formed to the specific article to be made. Alternatively, vacuum conduits can also be provided at the periphery of the bag, causing the bag to be adapted to any number of mold shapes without requiring vacuum conduits to be placed in the mold. The inventive bag may be constructed as a unitary article upon the base mold which forms the base for the construction of the desired fiber reinforced plastic article. The bag may be alternately formed from connected, preformed sheets, each of which contains molded in resin distribution channels.

The article contains an open sided, resilient main distribution conduit running laterally along the long axes of the desired vacuum bag with branch conduits, depending upon the shape of the mold, to provide for long distance flow of resin to all parts of the article to be made. A multiplicity of cross channels are then formed on the inner surface of the bag, covering most of the area in which the fiber lay up is placed within the mold. These cross channels can be formed from a pattern of multiple, variegated small dots, pillars, cones, or pyramid shape structures, which, under vacuum, leave a multiplicity of small channels to run along the inner surface of the silicone rubber vacuum bag. This pattern of distribution channels covers most of the fiber lay up, except for a perimeter area which is left without channels to insure resin flow into rather than across the fiber lay up. Optionally, along the periphery of the vacuum bag, outside the area of the fiber lay up, is a continuous circumferential, non-collapsing vacuum outlet conduit.

Each of the major vacuum and resin conduits is provided with an inlet tube connection formed of an elongated thickened wall opening into which a vacuum tube or resin supply tube may be inserted and which is amenable to being sealed with a tacky tape or similar seal. This permits the resin introduction and vacuum draw to be through standard thick walled plastic tubing which can be inserted into the bag without the necessity of connectors.

The bag is sealed against the mold using appropriate tacky tape edge seals, although in some circumstances the bag itself has sufficient adhesion to be sealable.

The bag is most suitable for the repeated manufacture of a number of identical fiber reinforced plastic articles. The base mold can be used as structure upon which the vacuum bag is built. Either a wax lay up or an actual article covered with suitable separating materials can be laid up upon the mold and covered with a peel sheet. A resin distribution medium can then be laid over the peel sheet. This medium is then covered with a flexible open rod or tube running along the desired location of the resin distribution channels and the vacuum receiving channels. This set up is then sprayed or coated with a separation compound.

The vacuum bag of the invention is created by applying a viscous silicone rubber compound in multiple coats over the completed lay up, building the bag up to a suitable thickness. The silicone rubber is then cured and peeled away from the distribution medium and the positive tubing. The resulting silicone rubber structure contains an integral resin distribution medium and vacuum channels adapted to vacuum forming of the article. It may be readily reused as a vacuum bag for the repeated manufacture of fiber reinforced articles.

In the use of the inventive vacuum bag it is necessary only to lay up a dry fiber preform against the mold in the desired orientation and thickness. A peel layer or peel sheet may be applied over the fiber. The inventive silicone rubber vacuum bag is placed over the peel sheet and fiber, and sealed to the mold. A vacuum is applied and then resin introduced until resin runoff within the vacuum channels indicates total impregnation of the article. The article then is allowed to set until the resin cures.

The bag may then be readily peeled from the article, cleaned of any residual resin and reused.

As can be seen, once such a bag is made for a specific article, it can be reused without the necessity of laying up individual distribution media and channel structures for each repeated construction of copies of the fiber reinforced article.

It is accordingly the primary object of the invention to disclose a uniform vacuum bag structure which can be readily manufactured for a particular article and mold, and which integrates the features of resin distribution and vacuum draw off with the sealing and pressing features of a standard vacuum bag.

It is the further object of the invention to disclose a vacuum bag which is conformably formed to provide the most uniform possible pressure structure for the manufacture of a fiber reinforced composite structure against a mold.

It is the further object of the invention to disclose a vacuum bag which assures uniform resin distribution throughout the fiber lay up for a vacuum bag molded fiber reinforced composite structure.

It is the further object of the invention to disclose a vacuum bag which may be rapidly reused for the rapid production of a series of identical fiber reinforced composite structures on a mold.

It is the further object of the invention to disclose a process for creating a vacuum bag adapted to a particular mold and a particular desired composite structure, for rapid, accurate, and repeatable production of multiple copies of the fiber reinforced composite structure.

DETAILED DESCRIPTION OF THE INVENTION

Figure 1:
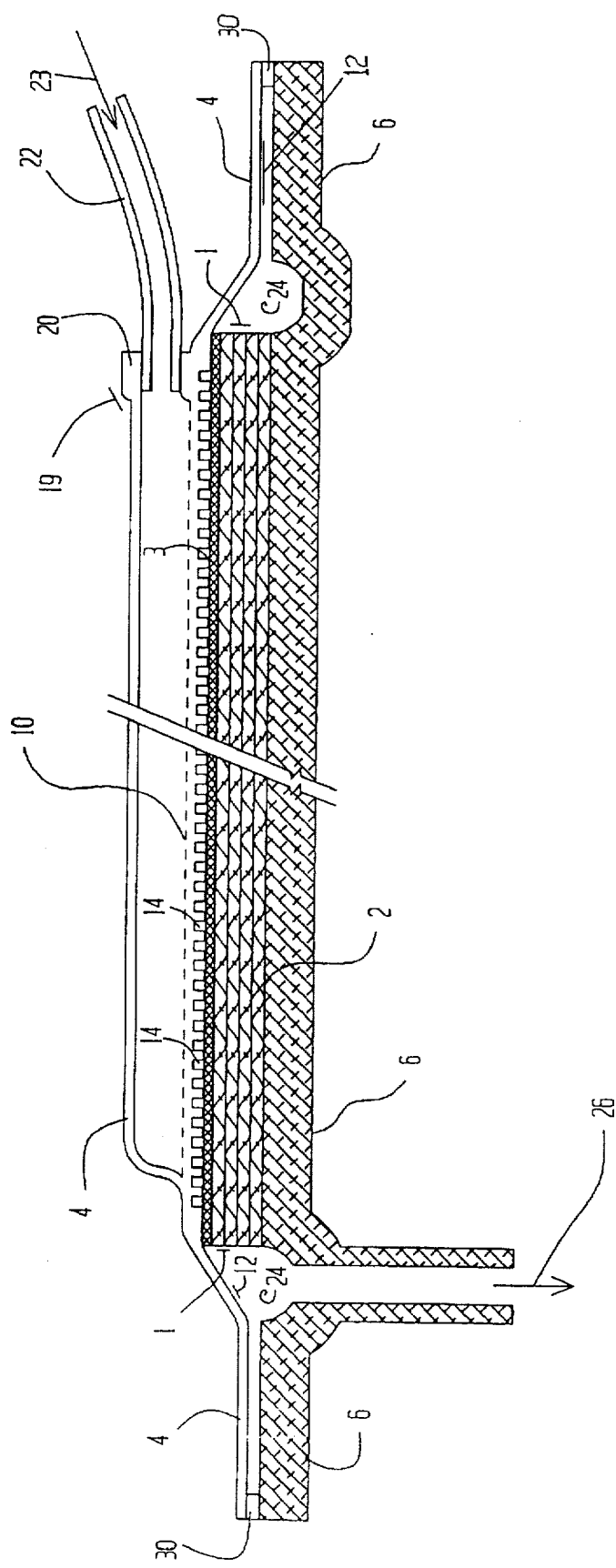
FIG. 1 is a side view of a fiber lay up using the invention.
Figure 2:
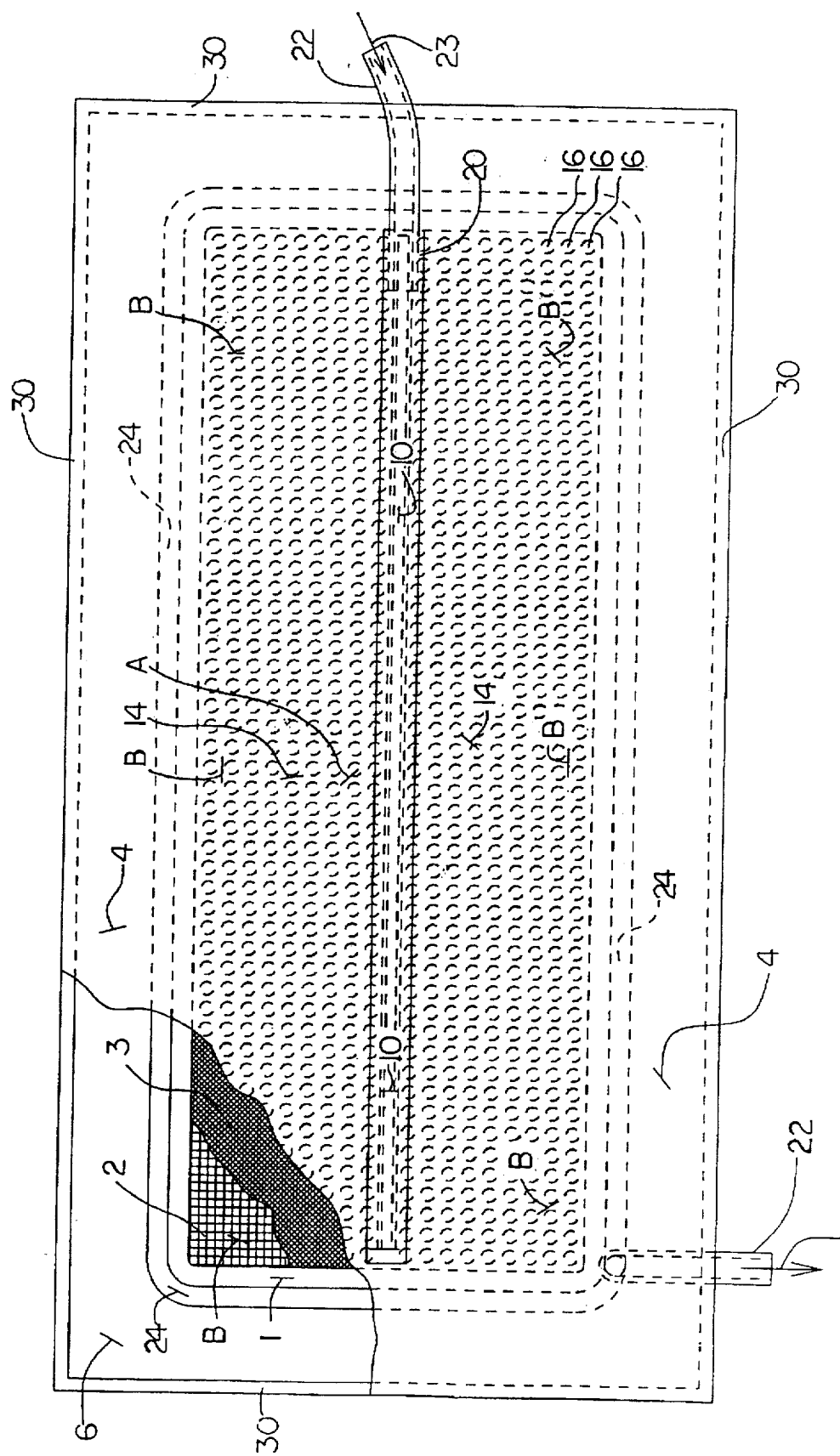
FIG. 2 is a top view of an embodiment of the invention.
Figure 3:
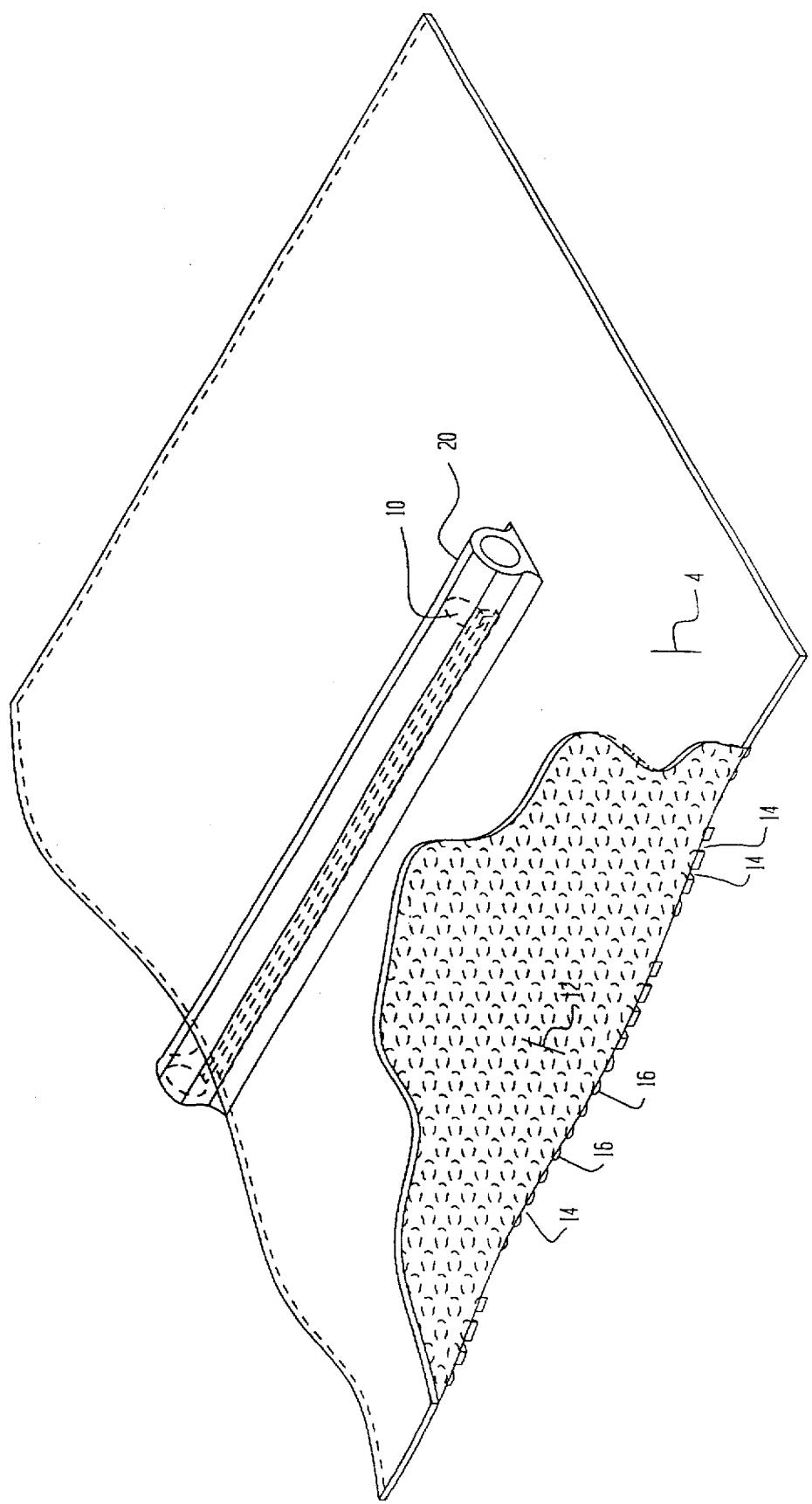
FIG. 3 is a sectional view of the invention, including a view of a conduit.
Figure 4:
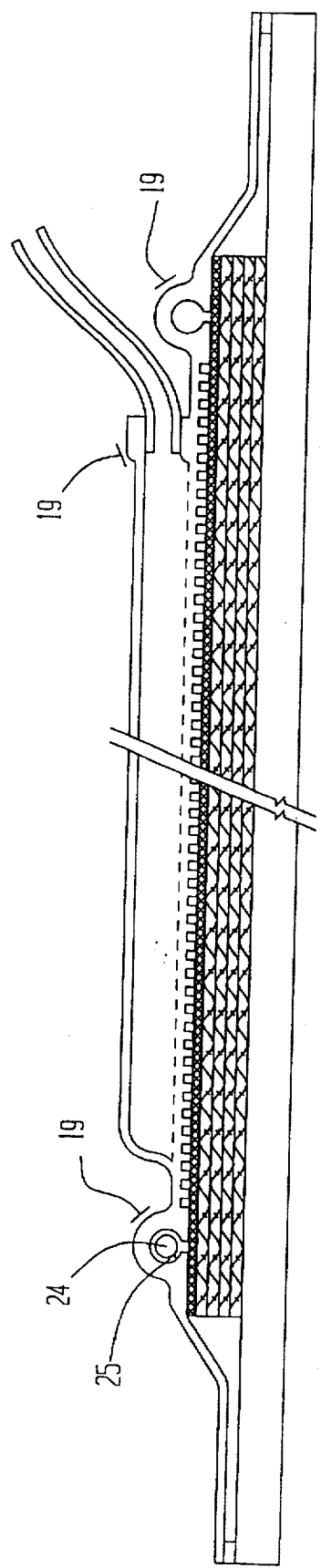
FIG. 4 is a cut away view of a second embodiment of the invention.
Figure 5:
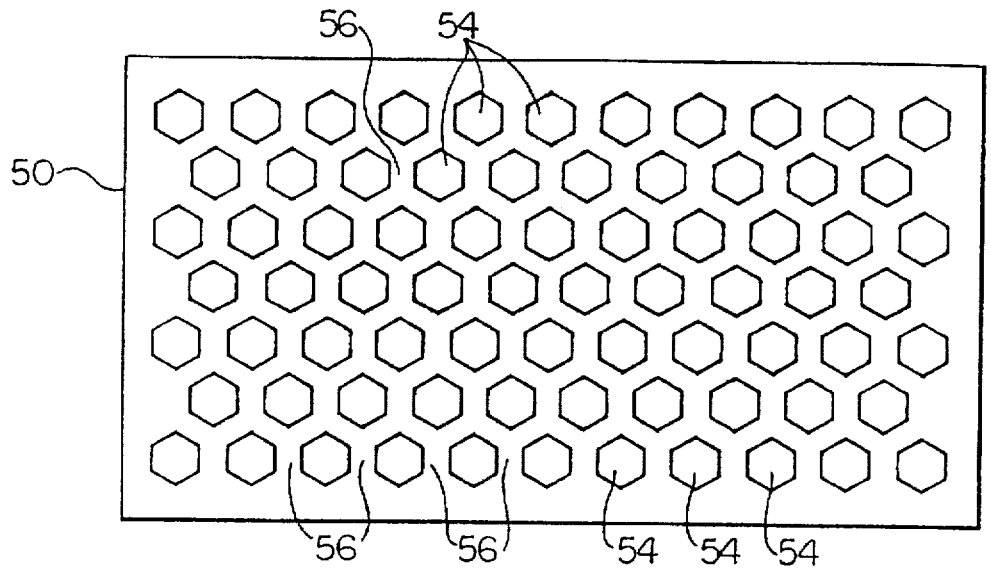
FIG. 5 is a face view of a pattern mask.
Figure 6:
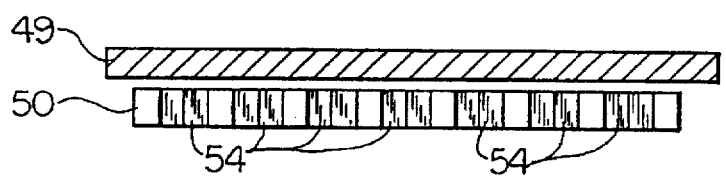
FIG. 6 is a section through FIG. 5.
Figure 7:
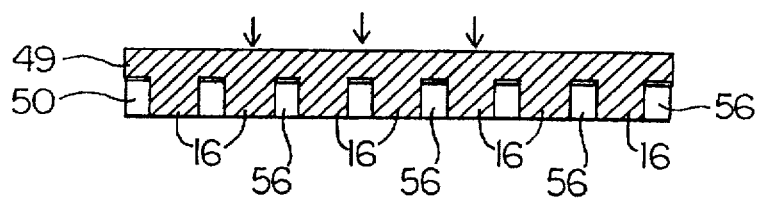
FIG. 7 is a section view showing formation of a sheet of the invention.

The invention is best shown in comparison to my prior U.S. Pat. No. 4,902,215, incorporated herein by reference in full. In side view in FIG. 1, I show a dry lay up for manufacture of a fiber composite structure 1, utilizing the inventive vacuum bag 4.

The composite 1 is formed on a rigid mold 6, for this illustrative purpose a flat smooth table surface forming a backing for the fiber composite article 1. A pattern of dry reinforcing fibers 2, such as fiberglass or carbon fibers, is laid on the mold 6. The shape of the mold 6 determines the shape of the final structure 1, and thus the mold 6 can be curved or of any desired shape, as will be illustrated below.

In the prior art, a peel sheet 3 would be placed over the fiber lay up 2, and then a distribution layer laid on the peel sheet to enhance flow of resin to impregnate the lay up 2. A resin entrance chamber would be centrally placed on the lay up with a communicating resin distribution chamber to communicate resin flow to the distribution layer. A vacuum outlet, either in the rigid mold or on the outer periphery of the lay up, would communicate with a source of vacuum. A vacuum bag or sheet would then be placed over the entire assembled lay up and distribution layers, and sealed around its perimeter to the mold. A vacuum, applied to the vacuum outlet, would draw the vacuum bag against the lay up. The vacuum both draws the resin throughout the fiber lay up, and presses the resin impregnated lay up against the rigid mold to smoothly form the desired fiber reinforced shape.

It should be appreciated that this process requires individual labor to set up the same distribution layers, chambers and vacuum bag in separate steps, even though identical articles may be desired. There are no economies of scale in this process, and every article manufactured is made as though it were a one of a kind article.

In the invention, a preformed vacuum bag with integral resin distribution piping and distribution pattern, and optional vacuum piping, is created for the composite article which is to be formed. To create this inventive vacuum bag 4, the desired rigid mold 6 is first covered with a model of the desired finished fiber composite structure 1. This can be a master article, manufactured as stated above, or a wax or wood model, or some combination of fiber composite base article and wax or wood additions, to create the external shape of the desired article 1. This master article pattern is then coated with a separation layer, such as a 50% soap and water mixture. The separation layer is allowed to completely dry.

A reverse master resin distribution pattern, of one of the various forms as illustrated in my prior '251 patent FIGS. 3-7, is then applied over the outer surface of the model article 1. This reverse master pattern may be the mirror image of any pattern of continuous small channels 14, preferable running in two cross wise directions. Such a reverse master pattern could include a repeated pattern of cylindrical dots, or small regular polyhedral solids 16. It can also include the pattern of spaced apart rows, crossed by an overlying pattern of spaced rows at right angles to the first rows.

Over the reverse master pattern is laid a hollow piping structure of significantly greater cross sectional area. Such a structure should run the long length of the desired article 1, and for a wide or complex shape, preferably has branch conduits so that no part of the article 1 is more than forty-eight inches from a conduit.

Optionally a second conduit structure 24 is placed as a continuous ring around the bag, communicating for vacuum flow from the mold 6, just outside the perimeter B of the pattern master article 1.

This distribution pattern and the conduit(s) are in turn coated with a separation layer which is allowed to dry.

The inventive vacuum bag 4 is then formed by repeated applications of an elastomer, such as a viscous, curable silicone rubber, or other peeling, resin resistant curable elastomer, to cover the assembled master pattern 1, building up a layer of elastomer with greater thickness over the hollow conduit structures 10, 24. Thicker extensions 19 extending outward from these conduit structures may be provided, to extend beyond the outer limits of the article 1, and to be completely coated with elastomer. The second conduit structure 24 may be reinforced by embedding a helical coil or spring 25 into the vacuum conduit 24 wall to prevent collapse of the conduit 24 upon application of a vacuum from a vacuum source 26.

A suitable material for forming vacuum bag 4 is Dow Corning Tooling Elastomer THT™. This elastomer is translucent, helping in monitoring the progress of the construction of the vacuum bag. This material has a viscosity of 450 poise, which helps give good brushability, and cures, when catalyzed, at room temperature within 24 hours.

After cure, the vacuum bag 4 is peeled from the underlying pattern article 1. The recommended elastomer has high tear strength, reducing the chance of damage to the finished bag. The bag may be additionally reinforced by fiber reinforcement, such as nylon fibers, applied as a hand lay up during the construction of the bag.

The conduit sections produce, within the finished bag 4, a pattern of elongated flow conduits 10 communicating with the inner surface 12 of the vacuum bag 4. These flow conduits 10 communicate for fluid flow with a resin distribution pattern 14, formed from the imprint of the reverse master resin distribution pattern. This pattern 14 will normally be a cross hatch of small channels at right angles to each other, separated by a repeated pattern of small bumps 16 on the inner surface of the bag. These bumps 16 may be pyramidal shapes, or spherical, or small cylindrical or square pillars. Any such repeated pattern of bumps 16 that will support the channels 14 against complete collapse under a vacuum is suitable, so that the bump pattern will press against the fiber lay up 2 but the channels 14 will remain open a spaced distance for resin flow.

The bag build up around the piping extensions creates hollow cured elastomeric tube receptacles 20 on the bag exterior, which connect for fluid flow with the interior elongated flow conduits 10 in the inner surface 12 of the bag 4. These tube receptacles 20 accept and seal an inserted plastic tube 22 for connection with a resin dispensing system 23, and, where a surrounding vacuum flow conduit 24, with reinforcing wall helical springs 25, has been formed in the bag 4, with tubing 22 connected to a vacuum source 26.

The resulting bag 4 is a monolithic vacuum bag structure having embedded resin conduits 10 and distribution channels 14 which have been customized to the article 1 desired to be made on a specific rigid mold 6. This inventive bag 4 can therefore be repeatedly used to make accurate, identical fiber reinforced articles 1. In each case it is necessary only to make the fiber lay up 2 against the mold 6, add the peel layer 3 if desired, and then cover the lay up with the vacuum bag 4 of the invention, sealing the bag to the mold with tacky seal 30.

The described material for making the inventive bag 4 does not adhere to resins. This has the advantage that the bag 4 can be easily peeled from the composite structure 1 and any residual resin in the distribution channels 10, 11 formed in the bag 4 may be easily removed. It has the disadvantage that it is difficult to seal the bag 4 to the mold 6 using the tapes of the prior art vacuum bag process. However, those skilled in the art know of a "tacky tape" which may be used to seal the bag to the mold, and Schnee Moorehead Adhesives Part #5601 has been reported to be suitable. Alternatively, a suitable adhering material, such as teflon, may be embedded in the perimeter of the vacuum bag during manufacture and cure, to provide a suitable surface to seal the bag. In some circumstances, such as where the mold is a planar smooth surface, such as a metal topped table, the silicone rubber vacuum bag may adhere to the table sufficiently to provide a suitable seal.

It is recognized that the design of the bag 4 should be such that the resin is distributed from the center of the article A to the periphery B, and the vacuum should be drawn from the periphery B. This set up serves to purge any air leaks from the seals at the periphery of the vacuum bag preventing air bubbles or voids in the resin impregnated fiber. This flow arrangement can easily be established by the set up of the article master pattern during the construction of the bag 4.

Figure 8:
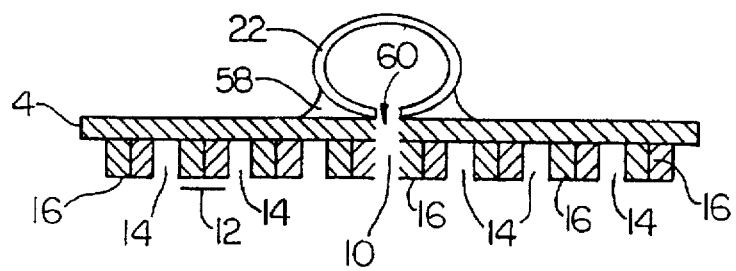
FIG. 8 is a section through a sheet of the invention.

The construction of the bag 4 is otherwise highly variable to meet the shape of the desired article and mold. For example, in my prior patent '215 FIG. 8, a section of the large structure such as a boat hull is shown. In such a structure, the flow of resin is aided by gravity to the periphery of the bag. If for any reason the mold should be inverted, than several resin inlets could be provided, and resin supplied to each in turn as the resin flows centrally outward through the reinforcing fiber lay up. The translucency of the vacuum bag is advantageous in that the progress of the resin can be visually followed by manufacturing personnel so as to sequence the supply of resin.

The vacuum outlet 26 does not have to be molded into the bag. Providing vacuum conduits 24 in the bag 4 may be useful on complicated molds 6, or where the mold 6 cannot be provided with an internal vacuum outlet 26 and distribution conduit 24. Otherwise the vacuum conduits 24 may be in the mold 6, and the bag 4, when created, is extended to cover the vacuum conduits 24, the distribution pattern 14 in the bag inner surface running almost to the position of the mold's vacuum conduits.

An alternate form of the inventive bag 4 is formed by providing a polymer film bag having sufficient rigidity to resist collapse under full vacuum, embossing within the polymer film a master resin distribution pattern to provide the pattern of continuous small channels 14 which may run in cross directions or in random directions so as to provide the desired two dimensional crosswise flow of the resin. In the case of a rigid polyethylene or plastic bag 4 of this inventive type, the master pattern would primarily comprise a repeated pattern of grooves or channels which may be regular or irregular in extent but which should extend uniformly across the entire sheet of the rigid bag. Placed within the rigid bag 4 is a hollow piping structure 22 of cross sectional area running the long length of the desired vacuum bag 4, alternately containing branch conduits 10 emanating at right angles from a long conduit. A resin supply 23 opening is provided into at least one part of the conduit through the rigidified vacuum bag 4.

The rigid conduits 10 provide for supply of resin which is rapidly distributed under the rigidified plastic sheet under the application of vacuum. The rigidified plastic sheet is chosen of a material which will conform in general shape to the article being formed but which will maintain the internal channel structure 10, 14 for the distribution of resin between the bag 4 and the article being formed even under the application of a vacuum to the overall bag 4. Thus the bag forms the resin distribution panel 14 from a cross hatch, which can include a random cross hatch, of non-collapsing essentially V-shaped channels which the stiffness of the bag retains even under the application of a vacuum.

A suitable material for forming such a bag is polyethylene sheet. This material remains sufficiently flexible that it can be rapidly applied over the fiber lay up of an article by means of tacky tape as described above and has the further advantage that it provides for a ready and even distribution of resin even under a one time use. The chosen material is not adhesive to resin and may easily be pealed from the resin. If desired, a suitable separation layer may applied to the interface of the material before being laid up against the article to be impregnated. This alternate form of the bag has the advantage, therefore, that it is suitable for one time as well as repeated use and provides the integral uniform resin channels without requiring a separate distribution layer between the outer vacuum bag and the article being laid up.

An alternate form of inventive vacuum bag 4 is formed from a sheet 49 of uncured vacuum bag material. In the example described herein, this material is an uncured silicone rubber, but any thermo-setting or otherwise curable plastic material can readily be used for the process. A fixed mask 50 for generating a repeated pattern of uniform width resin flow channels 14 is provided.

In the preferred embodiment, mask 50 is a sheet 52 of metal or similar material with a repeated densely packed pattern of polygons 54 (preferably hexagons) cut into the sheet. Any regular circle, oval shape, or polygon 54 capable of being uniformly patterned within a sheet 52 would be suitable, and there is additionally no reason why any dense packed tiling of irregular patterns 54 (such as a Penrose tiling) could not readily be used. It is desirable that the distance between any resin channel 14 and the center of its adjoining polygon 54 in the sheet 52 be minimized and it is also desirable that the resin channels 14 be of a fairly uniform width so as to prevent uneven concentration of resin in the finished article. With regular polygons, this is accomplished by making the polygon 54 relatively small. A pattern of polygons ranging from under one inch across to less than a quarter of an inch across has been found suitable.

It is also suitable that the mask 50 be a cylindrical mask, with the sheet 49 molded into the mask by an embossing roller, or other form of extruding the sheet 49 into the pattern of the mask 50. Similarly, while the preferred embodiment uses a polygonal pattern in the mask 50 for forming the bumps 16 of the vacuum bag 4, a pattern such as densely packed ovoids (ovals or ovals having more pointed ends), or any other pattern which produces interwoven channels 14 which promote smooth even resin flow, may be suitable.

An elastomeric sheet 49 of material from which the vacuum bag 4 is to be formed is laid across this mask 50 and a vacuum drawn on the underside of the mask 50. An elastomeric sheet 49 may be a thermoplastic, thermoset plastic, silicone rubber, a polyurethene rubber, or other curable or plastic or elastomeric sheet. All such materials are settable: they may be deformed into a shape and then set in that shape to form the bag 4 of the invention. Alternately, pressure may be applied at the top of the sheet 49 to extrude the sheet 49 into the mask 50 forming the repeated pattern of raised bumps 16 on the sheet 49 corresponding to the polygonal structure embedded in the mask 50, and forming a series of recesses 14 in the sheet 49 corresponding to the lands 56 between each polygon 54 on the mask 50. The sheet 49 is then cured either by the application of suitable temperature cycling, by exposure to a curing agent or the like. Upon curing, the sheet 49 is then removed from the mask 50. The result is a vacuum bag sheet 4 having a uniform pattern of resin channels 14 throughout the sheet extending across the face 12 of the sheet, spaced from the base of the sheet by raised bumps 16 corresponding to the polygonal holes 54 within the mask 50. It can readily be seen how such sheets 49 can be mass produced repeatedly by use of the same mask 50.

In use, the vacuum bag 4 is formed by placing repeated sheets 49 over the article to be vacuum impregnated, which is laid up as a mat or repeated mats 2 of a fiber-reinforcing material such as fiberglass, carbon filament, boron filaments or the like over a shaping mold 6. The sheets 49 are then cut to fit and sealed with any suitable sealing compound, such as silicone rubber, to form a uniform bag 4 covering the article to be formed.

A flexible tube 22 is then laid periodically along the length of the formed bag 4 and sealed to the bag 4 by a circular band 58 of sealing compound along a length of the tube 22. A tool is then inserted into the tube and both the tube and the sheet are slit 60 along a length within the area sealed together by the sealing compound. The tube 22 is then connected to a supply 23 of resin.

A vacuum is then applied around the outer edges of the molded vacuum bag 4 substantially in the manner disclosed for the other embodiments above. This vacuum then draws resin from the supply tube 22, through the formed slit 60 and uniformly through the resin channels 14 formed in the sheet 49, drawing the resin down uniformly, impregnating the reinforcing fiber mat 2 laid over the mold 6. The pattern of channels 14 insures a uniform wetting action as well as a uniform distribution of resin.

The advantages of this embodiment are several: the sheets 49 may be mass produced for storage before use, and then fit and uniformly cut to any number of mold shapes, sealing the sheets together to make an overall vacuum bag 4. The bag 4 made of sheets 49 is particularly suited for multiple vacuum baggings of complex forms against a mating mold 6.

The method of applying the resin hose 22 and forming the connection from the resin hose 22 into the bag 4 is a particularly simple one and permits the resin hoses 22 to be applied as flow patterns may dictate based upon the underlying shape of the article being formed.

The inventive vacuum bag 4 of this embodiment of particular utility when used on a vacuum table having perimeter channels for drawing a vacuum and replaceable molds for lay up of small parts which may be placed upon the table.

It can thus be seen how this particular unitary vacuum bag 4 follows the pattern of the other embodiments in having an integrated uniform series of resin flow channels 14 molded within the bag 4 together a resin supply pipe 22 molded to the bag and how the bag 4 may be easily and uniformly fit to any number of complex mold shapes for the creation of a resin impregnated fiber reinforced article.

It can thus be seen that the invention provides a vacuum bag which has considerable operational advantages for repeated manufacture of fiber reinforced articles against molds, providing a unitary vacuum cover to both seal and press the resin into the fibers, as well as providing an integrated means for uniform distribution of resin to the fiber lay up and a uniform vacuum suction. Further the vacuum bag of the invention, being conformably build for the specific mold and article to be constructed, has none of wrinkling and folds of the prior art planar sheets used for vacuum bags, and therefore control of the surface smoothness of the manufactured fiber reinforced article is improved.

The invention extends past the specific embodiments described to include those equivalent structures and processes as will be apparent to those skilled in the art form the claims.

I claim:

1. A vacuum bag assembly for use with a mold for forming a fiber reinforced composite structure with a fiber lay up by vacuum bag molding, the vacuum bag assembly comprising:

a sheet having a periphery and an inner surface, the inner surface having a contour which defines spaces between the inner surface and the fiber lay up when the inner surface of the sheet is disposed adjacent the fiber lay up, the spaces remaining present upon the application of a vacuum to evacuate air from the spaces and to provide for the distribution of resin between the contoured inner surface and the fiber lay up; and a resin distribution conduit combined with the sheet so as to be removable from the composite structure with the sheet, said resin distribution conduit in fluid communication with the spaces defined between the contoured inner surface and the fiber lay up.

2. The vacuum bag of claim 1, wherein the spaces defined between the contoured inner surface and the fiber lay up comprise passages which have a smaller cross sectional area than a cross sectional area of the resin distribution conduit.

3. The vacuum bag of claim 1, wherein the contour which defines the spaces extends over most of the fiber lay up.

4. The vacuum bag of claim 3, wherein the spaces defined between the contoured inner surface and the fiber lay up are V-shaped.

5. The vacuum bag of claim 3, wherein the spaces defined between the contoured inner surface and the fiber lay up comprise a random cross hatch.

6. The vacuum bag of claim 1, wherein the contour is formed by upraised elements integrally formed in the inner surface of the sheet.

7. The vacuum bag of claim 6, wherein the upraised elements comprise a repeating pattern of bumps.

8. The vacuum bag of claim 6, wherein the upraised elements comprise pyramidal shapes, conical shapes, spherical shapes, cylindrical shapes, oval shapes, polygonal shapes, or square shapes.

9. The vacuum bag of claim 1, wherein the spaces defined between the contoured inner surface and the fiber lay up comprise channels which run continuously in two cross wise directions.

10. The vacuum bag of claim 1, further comprising a vacuum conduit extending around the periphery of the sheet.

11. The vacuum bag of claim 1, further comprising a sealant around the periphery of the sheet to seal the vacuum bag to the mold.

12. The vacuum bag of claim 1, wherein the sheet is formed to fit over the fiber lay up over the mold.

13. The vacuum bag of claim 1, wherein the sheet comprises a curable material.

14. The vacuum bag of claim 1, wherein the sheet comprises an extrudable material.

15. The vacuum bag of claim 1, wherein the sheet, comprises a settable material.

16. The vacuum bag of claim 1, wherein the sheet comprises an elastomeric material.

17. The vacuum bag of claim 1, wherein the sheet comprises a plastic material.

18. The vacuum bag of claim 1, wherein the sheet comprises a thermosetting material.

19. The vacuum bag of claim 1, wherein the sheet comprises a thermoplastic material.

20. The vacuum bag of claim 1, wherein the sheet comprises a silicone rubber.

21. The vacuum bag of claim 1, wherein the sheet comprises a polyurethane rubber.

22. The vacuum bag of claim 1, wherein the sheet comprises a polymer film.

23. The vacuum bag of claim 1, wherein the sheet comprises a polyethylene material.

24. The vacuum bag of claim 1, wherein the sheet has a stiffness sufficient to prevent collapse of the spaces against the fiber lay up under vacuum.

25. The vacuum bag of claim 1, further comprising a peel ply disposed between the inner surface of the sheet and the fiber lay up.

26. A vacuum bag assembly for use with a mold for forming a fiber reinforced composite structure with a fiber lay up by vacuum bag molding, the vacuum bag assembly comprising:

a sheet having a periphery and an inner surface;

a resin distribution conduit combined with the sheet so as to be removable from the composite structure with the sheet; and a plurality of resin distribution passages integrally formed in the inner surface of the sheet, the passages in fluid communication with the conduit for resin flow from the conduit to the passages, the sheet having a stiffness sufficient to prevent collapse of the passages against a fiber lay up under vacuum to permit resin flow through the passages.

27. The vacuum bag of claim 26, wherein the resin distribution passages have a smaller cross sectional area than a cross sectional area of the resin distribution conduit.

28. The vacuum bag of claim 26, wherein the resin distribution passages comprise channels separated by upraised elements integrally formed in the inner surface of the sheet.

29. The vacuum bag of claim 28, wherein the upraised elements comprise a repeating pattern of bumps.

30. The vacuum bag of claim 28, wherein the upraised elements comprise pyramidal shapes, conical shapes, spherical shapes, cylindrical shapes, oval shapes, polygonal shapes, or square shapes.

31. The vacuum bag of claim 26, wherein the passages extend over most of the fiber lay up.

32. The vacuum bag of claim 31, wherein the passages are V-shaped.

33. The vacuum bag of claim 31, wherein the passages comprise a random cross hatch.

34. The vacuum bag of claim 26, wherein the resin distribution passages run continuously in two cross wise directions.

35. The vacuum bag of claim 26, further comprising a vacuum conduit formed in the inner surface and extending around the periphery of the sheet.

36. The vacuum bag of claim 26, further comprising a sealant around the periphery of the sheet to seal the vacuum bag to the mold.

37. The vacuum bag of claim 26, wherein the sheet is formed to fit over the fiber lay up over the mold.

38. The vacuum bag of claim 26, wherein the sheet comprises a curable material.

39. The vacuum bag of claim 26, wherein the sheet comprises an extrudable material.

40. The vacuum bag of claim 26, wherein the sheet comprises a settable material.

41. The vacuum bag of claim 26, wherein the sheet comprises an elastomeric material.

42. The vacuum bag of claim 26, wherein the sheet comprises a plastic material.

43. The vacuum bag of claim 26, wherein the sheet comprises a thermosetting material.

44. The vacuum bag of claim 26, wherein the sheet comprises a thermoplastic material.

45. The vacuum bag of claim 26, wherein the sheet comprises a silicone rubber.

46. The vacuum bag of claim 26, wherein the sheet comprises a polyurethane rubber.

47. The vacuum bag of claim 26, wherein the sheet comprises a polymer film.

48. The vacuum bag of claim 26, wherein the sheet comprises a polyethylene material.

49. The vacuum bag of claim 26, further comprising a peel ply disposed between the inner surface of the sheet and the fiber lay up.

50. A method of forming a fiber reinforced composite structure by vacuum bag molding, the method comprising:

(a) placing a fiber lay up against a mold surface;

(b) providing a vacuum bag assembly comprising:

a sheet having a periphery and an inner surface, the inner surface having a contour which defines spaces between the inner surface and a fiber lay up for distribution of resin when the sheet is placed over the fiber lay up, and a resin distribution conduit combined with the sheet so as to be removable from the composite structure with the sheet, said resin distribution conduit in fluid communication with the spaces defined between the contoured inner surface and the fiber lay up;

(c) sealing the fiber lay up between the mold surface and the vacuum bag assembly, wherein the contoured inner surface of the sheet is disposed adjacent the fiber lay up; and (d) drawing uncured resin under vacuum through the resin distribution conduit and the resin distribution spaces to impregnate the fiber lay up.

51. The method of claim 50, wherein the resin flow spaces comprise passages which have a smaller cross sectional area than a cross sectional area of the resin distribution conduit.

52. The method of claim 50, wherein the step of drawing the uncured resin under vacuum further comprises connecting the spaces defined by the contoured inner surface of the vacuum bag to a vacuum outlet.

53. The method of claim 50, wherein the step of drawing the uncured resin under vacuum further comprises providing a vacuum conduit around the periphery of the sheet.

54. The method of claim 50, wherein the step of drawing the uncured resin under vacuum further comprises connecting a source of the uncured resin to the resin distribution conduit.

55. The method of claim 50, further comprising curing the resin to form a composite structure.

56. The method of claim 50, further comprising allowing the resin to cure to form a composite structure.

57. The method of claim 50, wherein the step of sealing the fiber lay up between the mold surface and the vacuum bag further comprises placing a peel ply between the fiber lay up and the inner surface of the sheet.

* * * * *